(12) United States Patent
Kawarabayashi et al.

(10) Patent No.: US 8,812,288 B2
(45) Date of Patent: Aug. 19, 2014

(54) SPEED CONVERTING APPARATUS WITH LOAD CONTROLLING FUNCTION AND INFORMATION PROCESSING SYSTEM

(75) Inventors: Minoru Kawarabayashi, Kawasaki (JP); Takayuki Shimamura, Kawasaki (JP); Tatekuni Onoue, Yokohama (JP); Yasuyuki Umezaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1968 days.

(21) Appl. No.: 11/153,419

(22) Filed: Jun. 16, 2005

(65) Prior Publication Data

US 2006/0212285 A1 Sep. 21, 2006

(30) Foreign Application Priority Data

Mar. 16, 2005 (JP) .................. 2005-075092

(51) Int. Cl.
*G06F 9/455* (2006.01)
(52) U.S. Cl.
USPC .......................................................... 703/25
(58) Field of Classification Search
USPC .......................................................... 703/25
See application file for complete search history.

(56) References Cited

U.S. PATENT DOCUMENTS

| | | | | |
|---|---|---|---|---|
| 5,371,878 | A * | 12/1994 | Coker | 703/28 |
| 5,946,472 | A * | 8/1999 | Graves et al. | 703/6 |
| 6,785,849 | B1 | 8/2004 | Gaspar et al. | |
| 2004/0015330 | A1 | 1/2004 | Ghameshlu et al. | |

FOREIGN PATENT DOCUMENTS

| | | |
|---|---|---|
| EP | 1 091 280 | 4/2001 |
| JP | 8-16425 | 1/1996 |
| JP | 11-265299 | 9/1999 |
| JP | 2000-49287 | 2/2000 |
| KR | 10-0178755 | 11/1998 |
| WO | WO 02/063473 | 8/2002 |

OTHER PUBLICATIONS

Korean Patent Office Notification of Reasons for Refusal, dated Sep. 27, 2006, and issued in related Korean Patent Application No. 10-2005-0064659.
European Search Report for application No. 05 25 4030 issued Feb. 4, 2013.

* cited by examiner

*Primary Examiner* — Kamini S Shah
*Assistant Examiner* — Luke Osborne
(74) *Attorney, Agent, or Firm* — Staas & Halsey LLP

(57) ABSTRACT

A speed converting apparatus with a load controlling function comprises a first interface unit operating for an emulation device according to a system clock of the emulation device, a second interface unit operating for an arithmetic unit according to a system clock of the arithmetic unit, and a load controlling unit controlling at least either a load of a request outputted to the emulation device on the emulation device or a load of a request outputted to the arithmetic unit on the arithmetic unit. In performance verification or connection verification of a target to be verified, the speed converting apparatus can vary a load of a request issued to the target to be verified on the target or a load issued to a verification device on the verification device, while absorbing a difference in operation speed between the target to be verified and the verification device.

20 Claims, 7 Drawing Sheets

SPEED CONVERTING APPARATUS WITH LOAD CONTROLLING FUNCTION AND INFORMATION PROCESSING SYSTEM

BACKGROUND OF THE INVENTION

1) Field of the Invention

The present invention relates to a technique for performing performance verification on a target to be verified, and connection verification between the target to be verified and a verification device (for example, CPU: Central Processing Unit) connected to the target to be verified.

2) Description of the Related Art

When an electronic device (a system controller, for example) mounted thereon a semiconductor integrated circuit (an LSI: Large Scale Integration, for example) is developed, verification of the performance of the electronic device, which is to be verified, verification of connection of the electronic device to a verification device (a CPU: Central Processing Unit, for example) connected to the electronic device and so forth are heretofore performed in order to find out a fault (bug and the like), a part that should be improved and the like in the electronic device (integrated circuit).

The performance verification and the connection verification are performed by loading (emulating) the electronic device, which is a target to be verified, onto an emulation device, and connecting the emulation device, on which the target to be verified is loaded, to a verification device via a speed converting apparatus (speed converting mechanism).

Why the speed converting apparatus is interposed between the emulation device and the verification device is that the verification device operates at relatively high speed because it is a real machine, whereas the emulation device can operate only at relatively lower processing speed than the verification device. By interposing the speed converting apparatus, a difference in operation speed between the emulation device and the verification device is absorbed.

Figure 7:
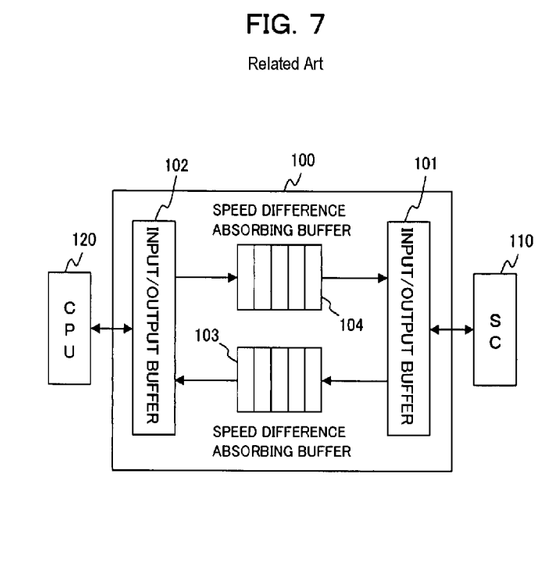
FIG. 7 is a block diagram showing a structure of a known speed converting apparatus.

Now, the structure of a known speed converting apparatus will be described with reference to FIG. 7. In FIG. 7, an SC (System Controller) 110 is an emulation device on which a system controller, which is a target to be verified, is emulated, and a CPU 120 is a verification device. The CPU 120 may be an apparatus actually connected to the system controller.

As shown in FIG. 7, a known speed converting apparatus 100 comprises an input/output buffer 101 for the SC 100, an input/output buffer 102 for the CPU 120, a speed difference absorbing buffer 103 interposed between the input/output buffers 101 and 102 to retain a transaction (for example, request) issued from the SC 110 to the CPU 120, and a speed difference absorbing buffer 104 interposed between the input/output buffers 101 and 102 to retain a transaction from the CPU 120 to the SC 110.

The speed difference absorbing buffers 103 and 104 are buffers having the cue structure. A difference in operation speed between the SC 110 and the CPU 120 is absorbed by the speed difference absorbing buffers 103 and 104.

In the speed converting apparatus 100, an intervals at which transactions are issued from the CPU 120 to the lower-speed SC 110 simply changes such that the transactions are gradually jammed toward the SC 110.

As another performance verification, there has been proposed a technique for assisting system development, focused on both software and hardware of a data processing system to be a system-on-chip (refer to Patent Document 1 below, for example).

In verification of the performance of a target to be verified or verification of the connection of a target to be verified and a verification device, efficiently finding a fault of the target to be verified or a part that should be improved is useful to shorten the time required for development of the target to be verified or development of an excellent apparatus.

In the performance verification or the connection verification, it is thus preferable to change the interval at which transactions (requests, for example) are issued to the target to be verified (that is, the emulation device) or the verification device connected to the target to be verified, the timing of issuance of the transaction, the contents of the issued transaction and the like, thereby to change the load on the target to be verified and the verification device due to the transaction.

However, the known speed converting apparatus 100 described above with reference to FIG. 7 can only absorb the difference in operation speed between the SC 110 to be verified and the CPU 120, and cannot vary the load on the target to be verified or the verification device due to a transaction. The technique disclosed in the Patent Document 1 cannot vary the load on the target to be verified or the verification device due to a transaction.

[Patent Document 1] International Publication No. WO02/063473

SUMMARY OF THE INVENTION

In the light of the above problems, an object of the present invention is to be able to vary a load on the target to be verified caused by a request issued to a target to be verified or a load on the verification device caused by a request issued to a verification device while a difference in operation speed between the target to be verified and the verification device is absorbed, in verification on the operation of the target to be verified or verification on the connection of the target to be verified and the verification device.

To attain the above object, the present invention provides a speed converting apparatus with a load controlling function interposed between an emulation device on which a target to be verified is emulated and an arithmetic unit connected to the emulation device to verify the target to be verified, on the basis of an operation of the emulation device in response to a request to the emulation device, to absorb a difference in operation speed between the emulation device and the arithmetic unit, the speed converting apparatus comprising a first interface unit operating for the emulation device according to a system clock of the emulation device to function as an interface with the emulation device, a second interface unit operating for the arithmetic unit according to a system clock of the arithmetic unit to function as an interface with the arithmetic unit, and a load controlling unit interposed between the first interface unit and the second interface unit to control at least either a load on the emulation device caused by a request outputted to the emulation device through the first interface unit or a load on the arithmetic unit caused by a request outputted to the arithmetic unit through the second interface unit.

It is preferable that the first interface unit comprises a first storage unit performing an operation of writing a request generated by the emulation device according to the system clock of the emulation device, and performing an operation of reading out the request to the arithmetic unit according to the system clock of the arithmetic unit.

It is preferable that the second interface unit comprises a second storage unit performing an operation of writing a request generated by the arithmetic unit according to the system clock of the arithmetic unit, and performing an operation of reading out the request to the emulation device according to the system clock of the emulation device.

It is preferable that the speed converting apparatus with a load controlling function further comprises a first output interval varying unit for varying an interval at which requests are to be outputted to the emulation device.

It is preferable that the speed converting apparatus with a load controlling function further comprises a second output interval varying unit for varying an interval at which requests are to be outputted to the arithmetic unit.

It is preferable that the load controlling unit comprises a generating unit for generating a request to the emulation device. At this time, it is preferable that the generating unit comprises a first generating unit for generating a request to the emulation device by using data retained in a cache memory of the emulation device, and a second generating unit for generating a request to the emulation device by using data not retained in the cache memory of the emulation device.

It is preferable that the speed converting apparatus with a load controlling function further comprises a first data information retaining unit for retaining data information on the data retained in the cache memory of the emulation device, and the first generating unit generates a request to the emulation device on the basis of the data information retained in the first data information retaining unit.

It is preferable that the load controlling unit comprises a generating unit for generating a request to the arithmetic unit. At this time, it is preferable that the generating unit comprises a first generating unit for generating a request to the arithmetic unit by using data retained in a cache memory of the arithmetic unit, and a second generating unit for generating a request to the arithmetic unit by using data not retained in the cache memory of the arithmetic unit.

Further, it is preferable that the speed converting apparatus with a load controlling function further comprises a second data information retaining unit for retaining data information on the data retained in the cache memory of the arithmetic unit, and the first generating unit generates a request to the arithmetic unit on the basis of the data information retained in the second data information retaining unit.

The speed converting apparatus with a load controlling function of this invention has, separately, the first interface unit and the second interface unit for a target to be verified and the verification device, respectively, and the load controlling unit controlling at least either a load on the target caused by a request to the target to be verified or a load on the verification device caused by a request to the verification device, thereby actively varying the load of a request on the target to be verified or the verification device. Accordingly, it is possible to largely improve the efficiency of verification on the performance of a target to be verified and verification on the connection of a target to be verified and the verification device, which allows great improvement of the quality of the target to be verified within a short time.

DESCRIPTION OF THE PREFERRED EMBODIMENTS

Hereinafter, description will be made of an embodiment of this invention with reference to the drawings.

[1] Embodiment of the Invention

First, description will be made of a structure of a speed converting apparatus with a load controlling function (hereinafter referred to simply as a speed converting apparatus) according to an embodiment of this invention with reference to block diagrams shown in FIGS. 1 and 2.

Figure 1:
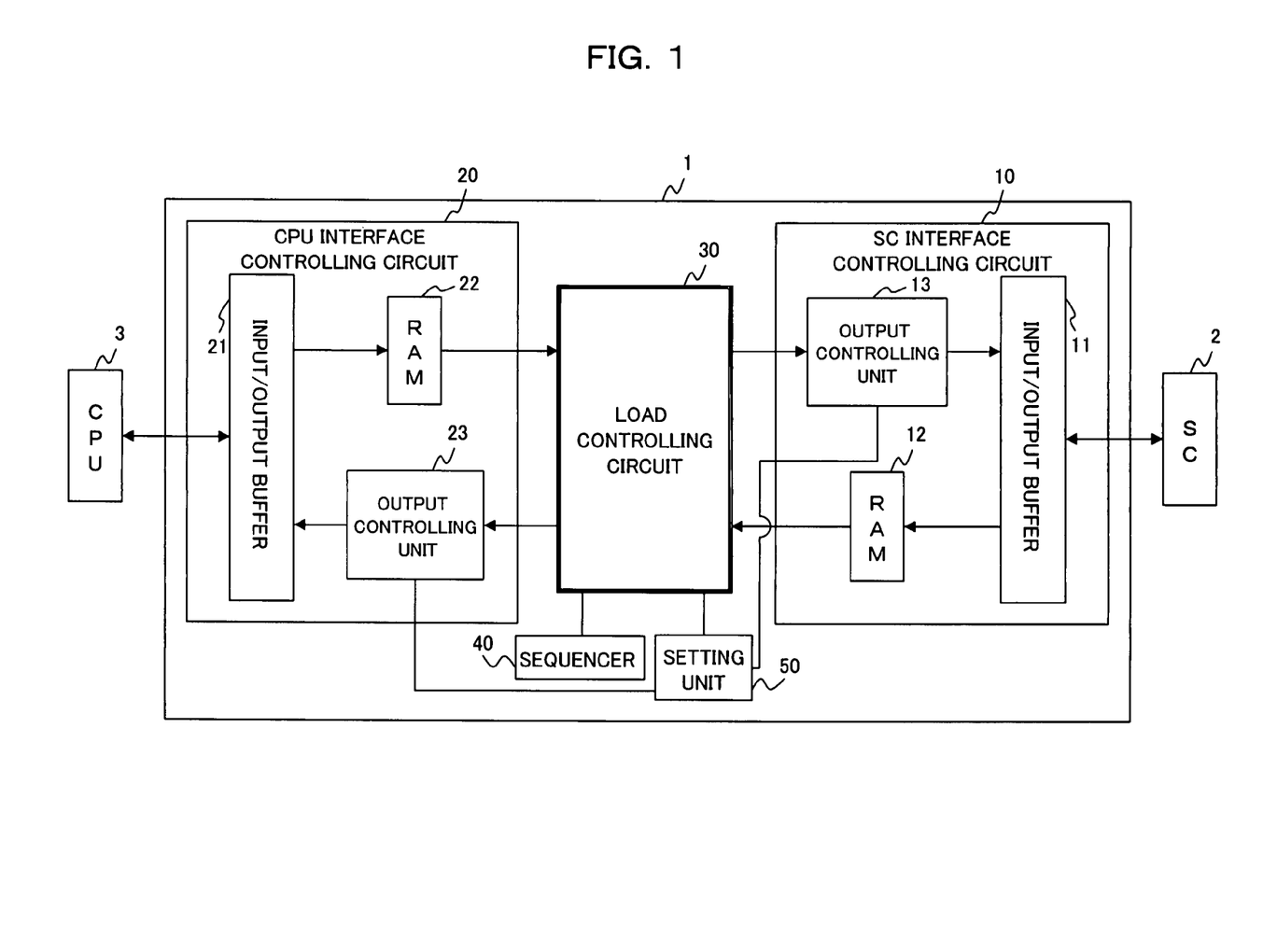
FIG. 1 is a block diagram showing a structure of a speed converting apparatus with a load controlling function according to an embodiment of this invention.

As shown in FIG. 1, the speed converting apparatus 1 is interposed between an emulation device (denoted as SC in the drawings) 2 on which a system controller as being a target to be verified is loaded (emulated) and an arithmetic unit (CPU: Central Processing Unit) 3 for verifying the system controller (target to be verified) on the basis of the operation of the emulation device 2 in response to a transaction (here, a request) to the emulation device 2. The speed converting apparatus 1 comprises an SC interface controlling circuit (first interface unit) 10, a CPU interface controlling circuit (second interface unit) 20, a load controlling circuit (load controlling unit) 30, a sequencer (request contents setting unit) 40 and a setting unit 50.

The SC interface controlling circuit 10, the CPU interface controlling circuit 20, the load controlling circuit 30 and the sequencer 40 of the speed converting apparatus 1 are configured on an FPGA (Field Programmable Gate Array) 1' (refer to FIG. 2 to be described later).

The SC interface controlling circuit 10 is an interface for the SC 2, which operates for the emulation device (hereinafter simply referred to as an SC) according to the system clock of the SC 2. The SC interface controlling circuit 10 comprises an input/output buffer 11, a storage unit (RAM: Random Access Memory; first storage unit) 12, and an output controlling unit (first output interval varying unit) 13.

The input/output buffer 11 receives and passes data (requests and the like) from and to the SC 2.

The storage unit 12 retains the same data as data retained in a storage unit (a cache memory, for example) in the SC 2, and temporarily retains a request, a response to a request or the like generated by the SC 2.

The storage unit 12 writes a request or the like generated by the SC 2 according to the system clock of the SC 2, and reads out the request or the like to the arithmetic unit (hereinafter referred to as a CPU) 3 according to the system clock of the CPU 3. The storage unit 12 is preferably a dual port RAM.

The output controlling unit 13 varies the interval (time interval) at which requests to the SC 2 are to be outputted to the SC 2. For example, the output controlling unit 13 allows a plurality of requests to the SC 2 issued from the CPU 3 to be outputted to the SC 2 at shorter intervals than the intervals at which requests have been issued from the CPU 3, or allows a plurality of requests to be outputted to the SC 2 at wider intervals than the interval(s) at which the requests have been issued from the CPU 3. Whereby, the output controlling unit 13 can vary the load on the SC 2 due to requests to the SC 2.

The CPU interface controlling circuit 20 is an interface with the CPU 3, which operates for the CPU 3 according to the system clock of the CPU 3. The CPU interface controlling circuit 20 comprises an input/output buffer 21, a storage unit (RAM: Random Access Memory; second storage unit) 22, and an output controlling unit (second output interval varying unit) 23.

The input/output buffer 21 receives and passes data (requests and the like) from and to the CPU 3.

The storage unit 22 retains the same data as data retained in a storage unit (for example, a cache memory) in the CPU 3, and temporarily retains a request generated by the CPU 3 or a response to the request.

The storage unit 22 writes a request or the like generated by the CPU 3 according to the system clock of the CPU 3, and reads out the request or the like to the SC 2 according to the system clock of the SC 2. The storage unit 22 is preferably a dual port RAM.

The output controlling unit 23 varies the interval (time interval) at which requests to the CPU 3 are to be outputted to the CPU 3. For example, the output controlling unit 23 allows a plurality of requests to the CPU 3 issued from the SC 2 to be outputted to the CPU 3 at narrower intervals than the intervals at which the requests haven issued from the SC 2, or allows a plurality of requests to be outputted to the CPU 3 at wider intervals than intervals at which the requests have been issued from the SC 2. Whereby, the output controlling unit 23 can vary the load of a request to the CPU 3 on the CPU 3.

The load controlling circuit 30 is interposed between the SC interface controlling circuit 10 and the CPU interface controlling circuit 20 to control the load of requests outputted to the SC 2 through the SC interface controlling circuit 10 on the SC 2, and controls the load of requests outputted to the CPU 3 through the CPU interface controlling circuit 20 on the CPU 3.

Namely, the load controlling circuit 30 does not output a request to be issued to the SC 2 to the SC 2 in the same way as the CPU 2 does, but changes the mode of the request issued from the CPU 3 to another mode differing from the normal mode (issuance state) and outputs the request to the SC 2, thereby controlling the load of the request on the SC 2.

Further, the load controlling circuit 30 does not output a request issued from the SC 2 to the CPU 3 in its original mode, but changes the mode to another mode differing from the normal mode and outputs the request to the CPU 3, thereby controlling the load of the request on the CPU 3.

Figure 2:
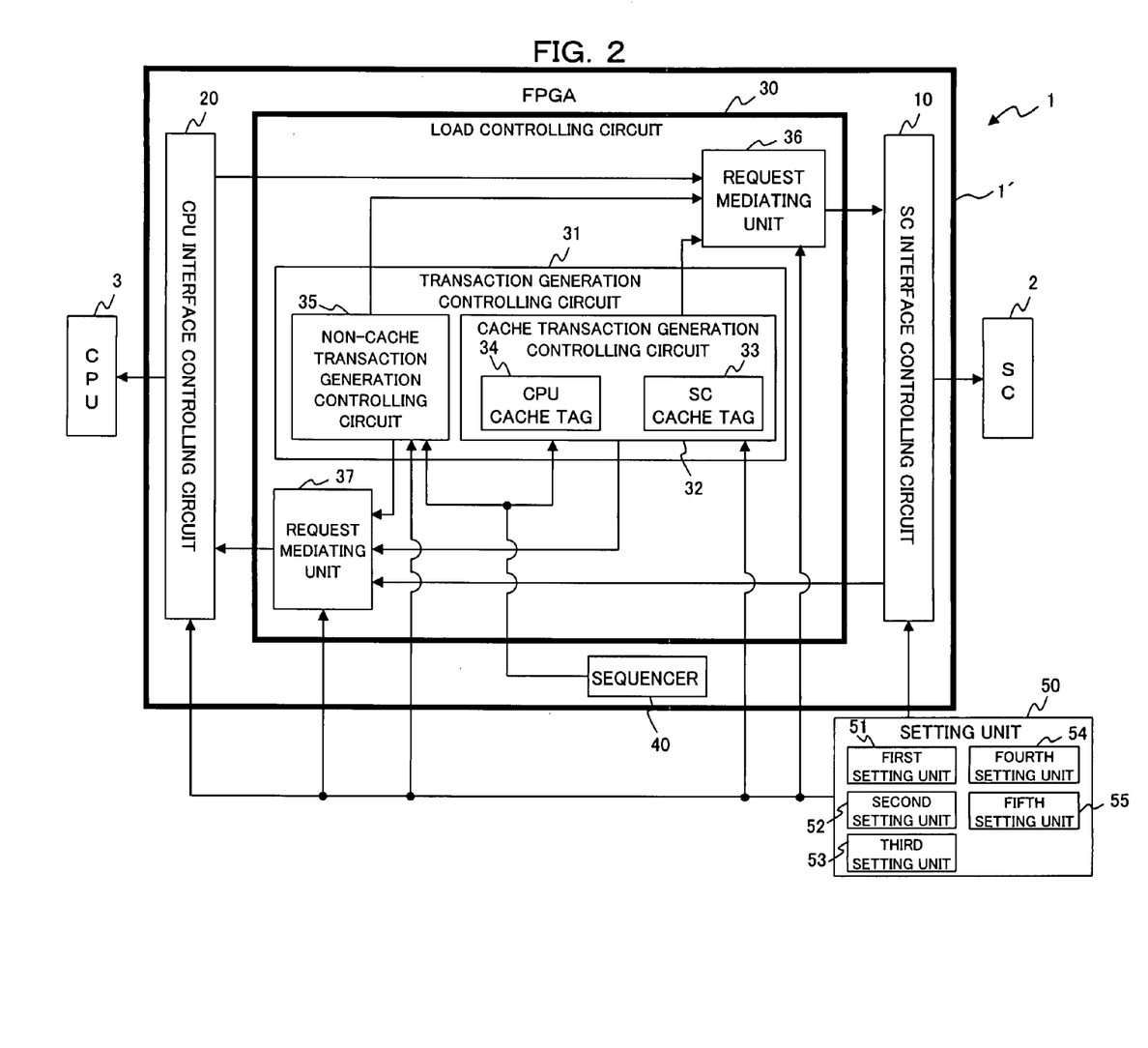
FIG. 2 is a block diagram showing the structure of the speed converting apparatus with a load controlling function according to the embodiment of this invention.

The load controlling circuit 30 comprises, as shown in FIG. 2, a transaction generation controlling circuit (generating unit) 31, a request mediating unit (first output order changing unit) 36 and a request mediating unit (second output order changing unit) 37.

The transaction generation controlling circuit 31 generates requests to the SC 2 and the CPU 3. Namely, the transaction generation controlling circuit 31 independently generates transactions (here, requests) to the SC 2 and the CPU 3, separately from a request to the SC 2 from the CPU 3 or a request to the CPU 3 from the SC 2.

The transaction generation controlling circuit 31 comprises a cache transaction generation controlling circuit (first generating unit) 32, and a non-cache transaction generation controlling circuit (second generating unit) 35.

The cache transaction generation controlling circuit 32 generates requests to the SC 2 and the CPU 3 by using data retained in storage units (for example, cache memories; not shown) provided in the SC 2 and the CPU 3, respectively. The cache transaction generation controlling circuit 32 comprises an SC cache tag (denoted as SC Cache TAG in the drawing; first data information retaining unit) retaining data information (TAG information) showing contents of the data retained in the cache memory of the SC 2, and a CPU cache tag (denoted as CPU Cache TAG in the drawing; second data information retaining unit) 34 retaining data information (TAG information) showing contents of the data retained in the cache memory of the CPU 3.

The cache transaction generation controlling unit 32 generates a request to the SC 2, by using data retained in the cache memory in the SC 2 on the basis of the data information retained in the SC cache tag 33.

The cache transaction generation controlling unit 32 also generates a request to the CPU 3, by using data retained in the cache memory in the CPU 3 on the basis of the data information retained in the CPU cache tag 34.

The non-cache transaction generation controlling circuit 35 generates a request to the SC 2, by using data not retained in the cache memory of the SC 2, and also generates a request to the CPU 3, by using data not retained in the cache memory of the CPU 3.

Generation of a request by the non-cache transaction generation controlling circuit 35 may be done on the basis of the data information retained in the SC cache tag 33 or the CPU cache tag 34 of the cache transaction generation controlling circuit 32, or may be done not on the basis of the data information retained in the SC cache tag 33 or the CPU cache tag 34. In either case, the non-cache transaction generation controlling circuit 35 generates a request, by using data not retained in the cache memory of the SC 2 and the CPU 3.

The request mediating unit 36 selects a request to be issued to the SC 2, thereby changing the order in which requests to the SC 2 are to be issued to the SC 2.

Namely, the request mediating unit 36 does not output a plurality of requests to the SC 2 generated by the CPU 3, the cache transaction generation controlling circuit 32 and/or the non-cache transaction generation controlling circuit 35 in the order in which the requests have been generated, but changes the order in which the requests are to be outputted and issues the requests to the SC interface controlling circuit 10 (here, the output controlling unit 13). Whereby, it is possible to increase the load on the SC 2.

The request mediating unit 37 selects a request to be issued to the CPU 3, thereby changing the order in which requests to the CPU 3 are to be outputted to the CPU 3.

Namely, the request mediating unit 37 does not output a plurality of requests to the CPU 3 generated by the SC 2, the cache transaction generation controlling circuit 32 and/or the non-cache transaction generation controlling circuit 35 in the order in which the requests have been generated, but changes the order in which the requests are to be outputted and issues the requests to the CPU interface controlling circuit 20 (here, the output controlling unit 23). Whereby, it is possible to increase the load on the CPU 3.

Figure 3:
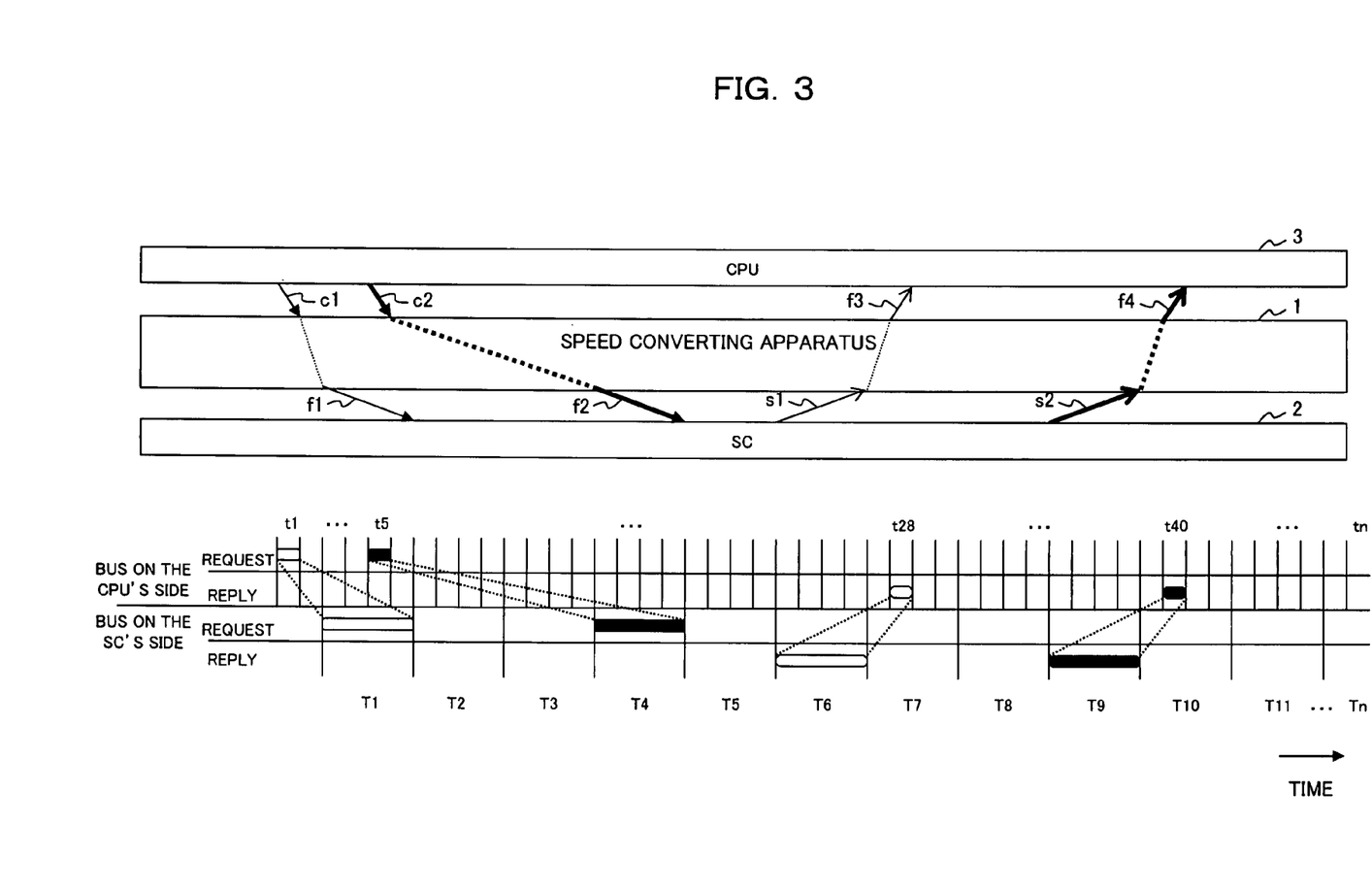
FIG. 3 is a diagram for illustrating an example of an operation of the speed converting apparatus with a load controlling function according to the embodiment of this invention.
Figure 4:
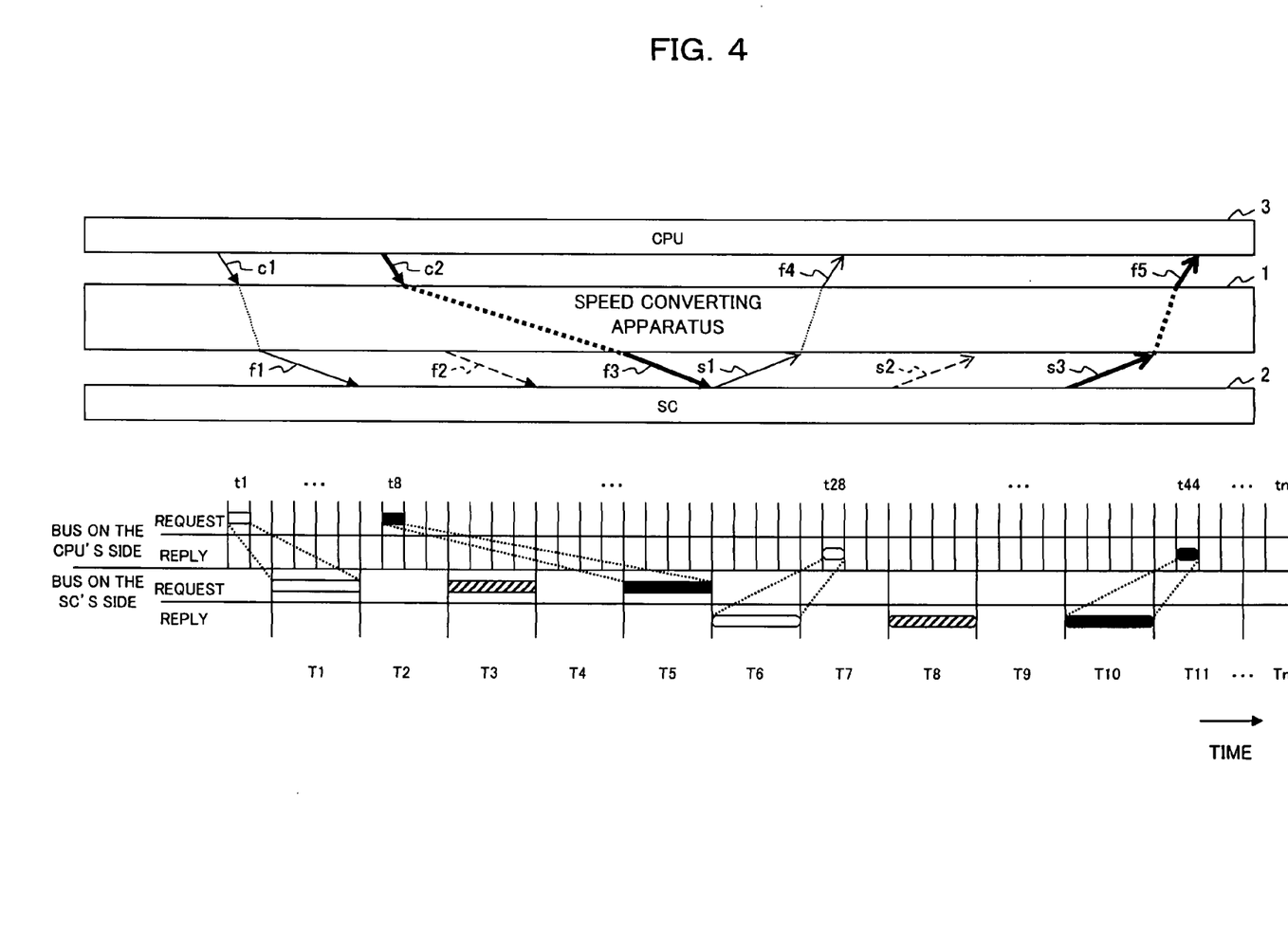
FIG. 4 is a diagram for illustrating an example of another operation of the speed converting apparatus with a load controlling function according to the embodiment of this invention.
Figure 5:
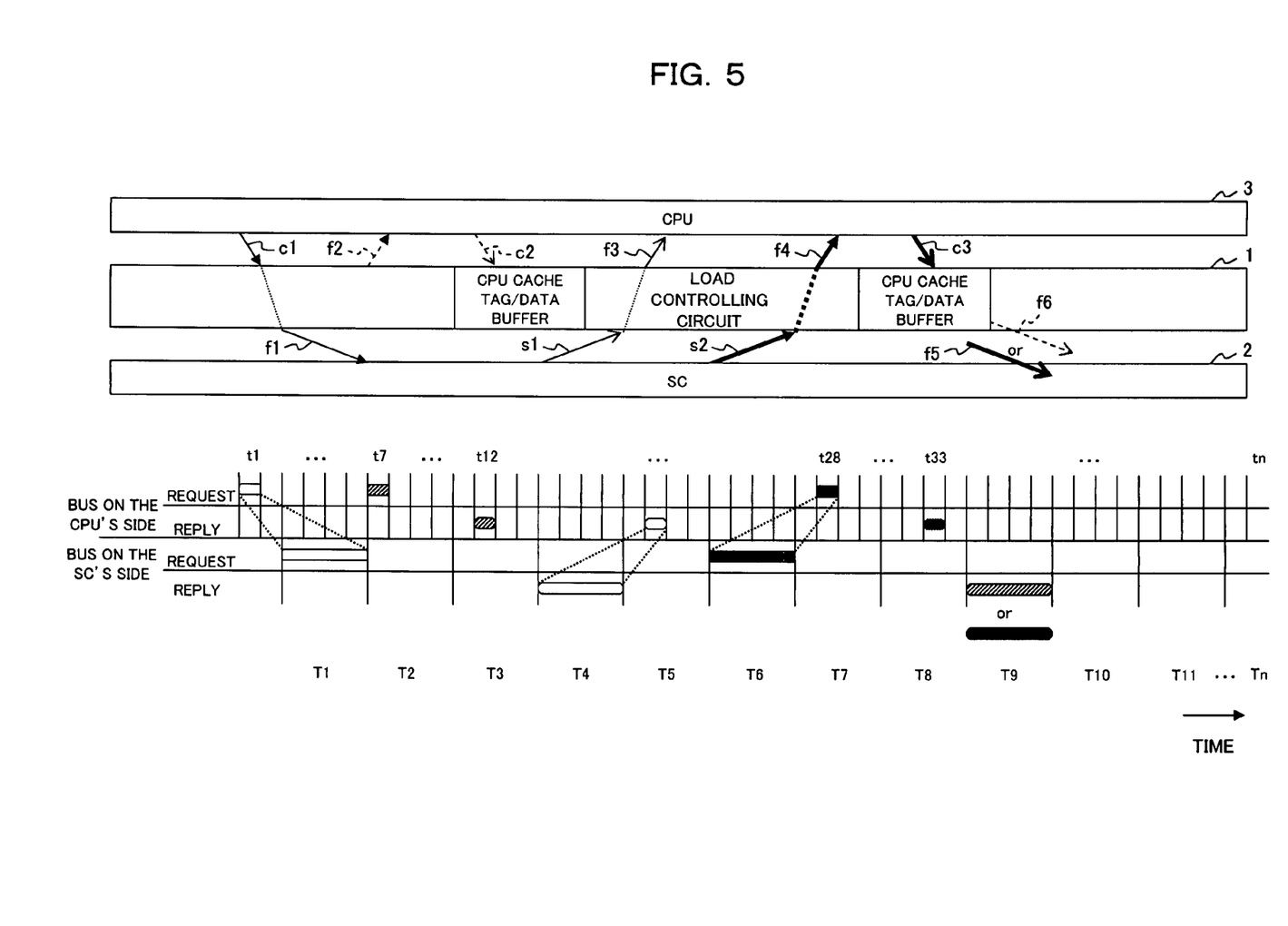
FIG. 5 is a diagram for illustrating an example of still another operation of the speed converting apparatus with a load controlling function according to the embodiment of this invention.

Now, description will be made of an example of the operations of the SC 2, the CPU 3 and the speed converting apparatus 1 with reference to FIGS. 3 through 5. In FIGS. 3 through 5, like reference characters designate like or corresponding parts, detailed description of which are thus omitted. In FIGS. 3 through 5, reference characters t1 to tn designate processing cycle units (system clock units of the CPU 3), and T1 to T*n* designate processing cycle units (system clock units of the SC 2).

First, the normal operation in which the load of requests on the SC 2 is not changed will be described with reference to FIG. 3. As shown in FIG. 3, when two request are generated by the CPU 3 and issued from the CPU 3 to the SC 2 (refer to arrows c1 and c2, and t1 and t5), the two requests are outputted to the SC 2 through the speed converting apparatus 1 (refer to arrows f1 and f2, and T1 and T4). The SC 2 executes the two requests in the order in which the SC 2 has received the two requests, and notifies the CPU 3 of responses to the requests (refer to arrows s1 and s2, and T6 and T9). The CPU 3 receives the responses from the speed converting apparatus 1 (refer to arrows f3 and f4, and t28 and t40), and the process is completed.

When the speed converting apparatus 1 transmits the requests generated by the CPU 3 to the SC 2 in the order in which the requests have been generated, the SC 2 receives the requests at an interval of two cycles (refer to T1 and T4) even if the CPU 3 issues the requests at an interval of three cycles (refer to t1 and t5). As a result, the interval between the requests looks shorter to the SC 2 which operates slower than the CPU 3.

When the output controlling unit 13 shortens the time interval at which the request are to be outputted, the interval between the two requests received by the SC 2 becomes further shorter, thus the load of the requests issued from the CPU 3 on the SC 2 is increased.

Next, description will be made of a case where the transaction generation controlling circuit 31 generates a request to the SC 2, with reference to FIG. 4. As shown in FIG. 4, the CPU 3 issues two requests to the SC 2 (refer to arrows c1 and c2, and t1 and t8). When the transaction generation controlling circuit 31 generates another request and outputs it to the SC 2 (refer to an arrow f2, and T3) while these requests are outputted to the SC 2 through the speed converting apparatus 1 (refer to arrows f1 and f3, and T1 and T5), the SC 2 executes the process in the order in which the SC 2 has received the three requests, and makes responses (refer to arrows s1, s2 and s3, and T6, T8 and T10).

In this case, responses to the requests issued from the CPU 3 are outputted to the CPU 3 through the speed converting apparatus 1 (refer to arrows f4 and f5, and t28 and t44). However, a response to the request issued from the transaction generation controlling circuit 31 is received by the speed converting apparatus 1, registered in the SC cache tag 33 (refer to an arrow s2), not passed to the CPU 3.

The transaction generation controlling circuit 31 generates a request to the SC 2, whereby the load of the requests on the SC 2 is increased.

In the example shown in FIG. 4, even when the transaction generation controlling circuit 31 generates a request to the SC 2 after the CPU 3 issues the second request (refer to an arrow c2), the request mediating unit 36 changes the order in which the requests are to be outputted to the SC 2, whereby it is possible to output the request generated by the transaction generation controlling circuit 31 to the SC 2 before the second request generated by the CPU 3 is outputted to the SC 2, as shown in FIG. 4.

Next, description will be made of a case where the load of a request to the CPU 3 on the CPU 3 is changed with reference to FIG. 5. As shown in FIG. 5, a request from the CPU 3 to the SC 2 is outputted to the SC 2 through the speed converting apparatus 1 (refer to arrows c1 and f1, and t1 and T1). When the transaction generation controlling circuit 31 generates a request to the CPU 3 (refer to an arrow f2, and t7) before the CPU 3 receives a response to the request from the SC 2 (refer to arrows s1 and f3, and T4 and t20), the CPU 3 executes a process for the request, and responds to the speed converting apparatus 1 (refer to an arrow c2, and t12).

This response is not passed to the SC 2, but registered in a data buffer (not shown) connected to the load generation controlling circuit 30 in the speed converting apparatus 1. When there is write-back data, this write-back data is retained in a relevant data buffer.

Namely, this data buffer is used to retain a response to a request generated by the transaction generation controlling circuit 31 from the SC 2 or the CPU 3. This data buffer retains a response to a request issued from the transaction generation controlling circuit 31, and the SC cache tag 33 and the CPU cache tag 34 retain data information on the data retained in the data buffer, whereby the SC 2 and the CPU 3 can cope with a request issued thereafter based on the request (a request issued on the assumption that a response to the request generated by the transaction generation controlling circuit 31 is retained in the SC 2 or the CPU 3). Even when the transaction generation controlling circuit 31 independently issues a request, it is possible to keep coherency between data retained in the SC 2 and data retained in the CPU 3.

As above, the transaction generation controlling circuit 31 generates a request to the CPU 3, whereby the load of the requests on the CPU 3 is increased.

When a request is issued from the SC 2 to the CPU 3 through the speed converting apparatus 1 (refer to arrows s2 and f4, and T6 and t28), the CPU 3 outputs a response to this request to the SC 2 through the speed converting apparatus 1 (refer to arrows c3 and f5, and t33 and T9). When the CPU 3 does not respond to this request from the SC 2, the above data buffer (not shown) responds to the SC 2 so long as it is found as a result of reference to the CPU cache tag 34 that the CPU cache tag 34 retains data information relating to data to be responded (refer to an arrow f6).

Next, description will be made of the sequencer 40 and the setting unit 50 with reference to FIGS. 1 and 2.

The sequencer 40 sets contents of a request to the SC 2 or the CPU 3 generated by the transaction generation controlling circuit 31 (the cache transaction generation controlling circuit 32 and the non-cache transaction generation controlling circuit 35).

Since the load controlling circuit 30 is configured on the FPGA 1' in the speed converting apparatus 1, the sequencer 40 rewrites a sequence setting file of the transaction generation controlling circuit 31 to designate (set) contents of a request to the SC 2 or the CPU 3 generated by the transaction generation controlling circuit 31.

When the sequencer 40 sets the contents of a request generated by the transaction generation controlling circuit 31, it is necessary to compile the FPGA 1'.

The setting unit 50 sets operations of the output controlling units 13 and 23, the transaction generation controlling circuit 31, and the request mediating units 36 and 37. Here, the setting unit 50 is comprised of a dip switch manually operated by the operator, for example.

The setting unit 50 comprises, as shown in FIG. 2, a first setting unit (first output interval setting unit) 51, a second setting unit (second output interval setting unit) 52, a third setting unit (mode setting unit) 53, a fourth setting unit (first output order setting unit) 54 and a fifth setting unit (second output order setting unit) 55.

The first setting unit 51 sets an output interval (output time interval) at which a plurality of requests are to be outputted to the SC 2 by the output controlling unit 13 in the SC interface controlling circuit 10.

The first setting unit 51 can freely change the output time interval (time interval based on the system clock of the SC 2) at which a plurality of requests are to be outputted to the SC 2 by the output controlling unit 13 to another time interval differing from a time interval at which these requests have been generated. It is thereby possible to output a plurality of requests generated by at least either the CPU 3 or the transaction generation controlling circuit 31 at a shorter time interval than an interval at which the requests have been generated, thereby increasing the load on the SC 2. On the other hand, it is also possible to output the plural requests at a wider time interval than the interval at which the requests have been generated, thereby decreasing the load on the SC 2.

The first setting unit 51 sets the output interval mode for a plurality of requests to be outputted to the SC 2 by the output controlling unit 23 from the normal mode to a different mode (debug mode) to vary the load on the SC 2 as above, whereby a bug or a part that should be improved in the SC 2, which is a target to be verified, can be easily found.

When the transaction generation controlling circuit 31 generates a specific request to the SC 2 by means of the sequencer 40, it is preferable that another request is not outputted to the SC 2 from when the SC 2 receives this request to when the SC 2 completes a process based on this request in order to verify the operation of the SC 2 on the basis of this request. For this, when a specific request is issued to the SC 2 by means of the sequencer 40, it is preferable that the first setting unit 51 sets the output mode of the request by the output controlling unit 13 to a sequential mode in which another request is not outputted to the SC 2 from when the SC 2 receives the request to when the SC 2 completes the process based on the request.

Just as the first setting unit 51 sets the output interval at which requests are to be outputted by the output controlling unit 13, the second setting unit 52 sets the output intervals at which requests are to be outputted to the CPU 3 by the output controlling unit 23 in the CPU interface controlling circuit 20.

Namely, the second setting unit 52 sets the output time interval (time interval based on the system clock of the CPU 3) at which a plurality of requests are to be outputted to the CPU 3 by the output controlling unit 23 to a shorter time interval than a time interval at which these requests have been generated, and outputs the requests to the CPU 3, whereby the load on the CPU 3 can be increased. On the other hand, the second setting unit 52 sets the time interval longer than the time interval at which the requests have been generated and outputs the requests, whereby the load on the CPU 3 is decreased.

Since the second setting unit 52 sets the mode of the output interval at which a plurality of requests are to be outputted to the SC 2 by the output controlling unit to the debug mode to vary the load on the SC 2 as above, it is possible to efficiently perform the performance verification on the CPU 3.

When the transaction generation controlling circuit 31 generates a specific request to the CPU 3 by means of the sequencer 40, the second setting unit 52 can set the mode for outputting requests by the output controlling unit 23 to a sequential mode in which another request is not outputted to the CPU 3 from when the CPU 3 receives this request to when the CPU 3 completes a process based on this request.

The third setting unit 53 sets a mode for generating a request by the transaction generation controlling circuit 31, setting whether or not the transaction generation controlling circuit 31 generates a request to the SC 2 or the CPU 3.

Namely, the third setting unit 53 sets whether or not the cache transaction generation controlling circuit 32 generates a request, and sets whether or not the non-cache transaction generation controlling circuit 35 generates a request.

Accordingly, the third setting unit 53 sets the transaction generation controlling circuit 31 to (1) a cache access generation mode in which only the cache transaction generation controlling circuit 32 generates a request, (2) anon-cache access generation mode in which only the non-cache transaction generation controlling circuit 35 generates a request, or (3) a random access generation mode in which both the cache transaction generation controlling circuit 32 and the non-cache transaction generation controlling circuit 35 generate requests.

In each of the above generations modes (1) to (3), the third setting unit 53 can set (a) a read mode in which only a read request is generated, (b) a write mode in which only a write request is generated, or (c) a read/write request mode in which both the read request and the write request are generated.

The fourth setting unit 54 sets a changed order by the request mediating unit 36 in which requests are to be issued. Namely, as described above with reference to FIG. 4, the fourth setting unit 54 can insert a request generated by the transaction generation controlling circuit 31 between requests issued from the CPU 3, and issue the request to the SC 2.

The fifth setting unit 55 sets a changed order by the request mediating unit 37 in which requests are to be issued. Like the fourth setting unit 54, the fifth setting unit 55 can insert a request generated by the transaction generation controlling circuit 31 between requests issued from the SC 2, and issue the request to the CPU 3, for example.

The setting unit 50 can combine the settings by the first setting unit 51 to the fifth setting unit 55, and can execute various settings set by the first setting unit 51 to the fifth setting unit 55 even while the speed converting apparatus 1 is in operation.

As described above, the speed converting apparatus 1 with the load controlling function according to the embodiment of this invention has the SC interface controlling circuit 10 and the CPU interface controlling circuit 20, which are independently used for the SC 2 and the CPU 3, respectively, and the load controlling circuit 30 for controlling the loads of requests to the SC 2 and the CPU 3 on the SC 2 and the CPU 3. Whereby, the speed converting apparatus 1 can actively vary the loads of requests on the SC 2, which is a target to be verified, and the CPU 3. As a result, it is possible to largely increase the efficiency of the verification on the performance of a target to be verified (SC 2) and the verification on the connection between the target to be verified and the CPU 3, which allows the quality of the target to be verified to be improved within a short period of time.

In concrete, the output controlling unit 13 in the SC interface controlling circuit 10 can shorten the output interval for a plurality of requests to the SC 2, or widen the same. It is thus possible to vary the load on the SC 2, which allows efficient performance verification and connection verification.

Since the first setting unit 51 in the setting unit 50 can set the output interval at which a plurality of requests are to be outputted by the output controlling unit 13, the operator of the speed converting apparatus 1 (hereinafter simply referred to as an operator) can freely set the output interval for a plurality of requests by the output controlling unit 13 to perform verification on a target to be verified more efficiently.

Since the output controlling unit 23 in the CPU interface controlling circuit 20 can change the output interval for a plurality of requests to the CPU 3, it is possible to vary the load on the CPU 3, which allows efficient performance verification and connection verification.

Further, since the second setting unit 52 in the setting unit 50 can set the output interval for a plurality of requests to be outputted by the output controlling unit 23, the operator can freely set the output interval for a plurality of requests by the output controlling unit 23, which allows efficient connection verification.

Still further, since the transaction generation controlling circuit 31 in the load controlling circuit 30 can independently generate requests to the SC 2 and the CPU 3, it can generate requests, which are not normally generated while the SC 2 and the CPU 3 are in operation. It is thereby possible to readily increase the loads on the SC 2 and the CPU 30, which allows efficient performance verification and connection verification.

The cache transaction generation controlling circuit 32 in the transaction generation controlling circuit 31 can generate requests by using data retained in the SC 2 and the CPU 3 on the basis of the SC cache tag 33 and the CPU cache tag 34. It is thereby possible to generate a request that the operator desires to verify.

The non-cache transaction generation controlling circuit 35 in the transaction generation controlling circuit 31 can generate a request by using data not retained in the SC 2 and the CPU 3. It is thereby possible to further increase the loads on the SC 2 and the CPU 3, which allows efficient performance verification and connection verification.

The third setting unit 53 in the setting unit 50 can set the mode for generating a request by the transaction generation controlling circuit 31 (namely, the cache access generation mode, the non-cache access generation mode and the random access generation mode described above). The operator can thereby designate a request generated by the transaction generation controlling circuit 31 (namely, the operator can designate whether or not the cache-transaction generation controlling circuit 32 generates a request, or whether or not the no-cache transaction generation controlling circuit 32 generates a request), which allows efficient performance verification and connection verification.

The sequencer 40 can designate contents of a request generated by the transaction generation controlling circuit 31. The operator can thereby freely generate a request that the operator desires to confirm, and certainly verify the performance caused by the request to be confirmed. This allows more efficient performance verification and connection verification.

The bus interface controlling units (the interface controlling circuits) are separately disposed for the SC 2 and the CPU 3, a response from the SC 2 or the CPU 3 to a request generated by the transaction generation controlling circuit 31 is stored in a data buffer connected to the load controlling circuit 30, and data information on the response is retained in the SC cache tag 33 or the CPU cache tag 34. It is thus possible to keep coherency of data between the SC 2 and the CPU 3 even when the transaction generation controlling circuit 31 independently generates a request.

The request mediating unit 36 in the load controlling circuit 30 can change the output order for a plurality of requests to the SC 2 to the order differing from the order in which these requests have been generated. As a result, it is possible to increase the load on the SC 2 to perform efficient performance verification and connection verification.

The fourth setting unit 54 in the setting unit 50 can set the output order of a plurality of requests changed by the request mediating unit 36. The operator can thereby freely set the order in which requests are to be outputted to the SC 2, which allows more efficient performance verification and connection verification.

The request mediating unit 37 in the load controlling circuit 30 can change the output order in which a plurality of requests are to be outputted to the CPU 3 to the order differing from the order in which the plural requests have been generated. As a result, it is possible to increase the load on the CPU 3, which allows efficient connection verification.

Further, since the fifth setting unit 55 in the setting unit 50 can set the output order for a plurality of requests changed by the request mediating unit 37, the operator can freely set the order in which requests are to be outputted to the CPU 3, which allows more efficient connection verification.

The settings set by the first setting unit 51 to the fifth setting unit 55 in the setting unit 50 can appropriately combined and executed. The operator can thereby freely combine operations that the operator desires to verify (that is, the kind, output interval, output order and the like of a request that the operator desires to verify) and set the operations, and execute the settings set by the first setting unit 51 to the fifth setting unit 55 even while the speed converting apparatus 1 is in the normal operation. Accordingly, the operator can freely adjust the load of a request to the SC 2 and the CPU 3 during the operation, and execute efficient verification in order to speed up the development of a target to be verified and improve the quality.

The storage unit 12 in the SC interface controlling circuit 10 operates for the SC 2 according to the system clock of the SC 2, and operates for the CPU 3 (here, the load controlling circuit 30) according to the system clock of the CPU 3. The storage unit 22 in the CPU interface controlling circuit 20 operates for the CPU 3 according to the system clock of the CPU 3, and operates for the SC 2 according to the system clock of the SC 2. It is thereby possible to certainly absorb a difference in operation speed between the SC (emulation device) 2 and the CPU 3.

[2] Others

Note that the present invention is not limited to the above examples, but may be modified in various ways without departing from the scope of the invention.

In the above embodiment, the setting unit 50 is composed of a dip switch, for example. However, this invention is not limited to this example.

Figure 6:
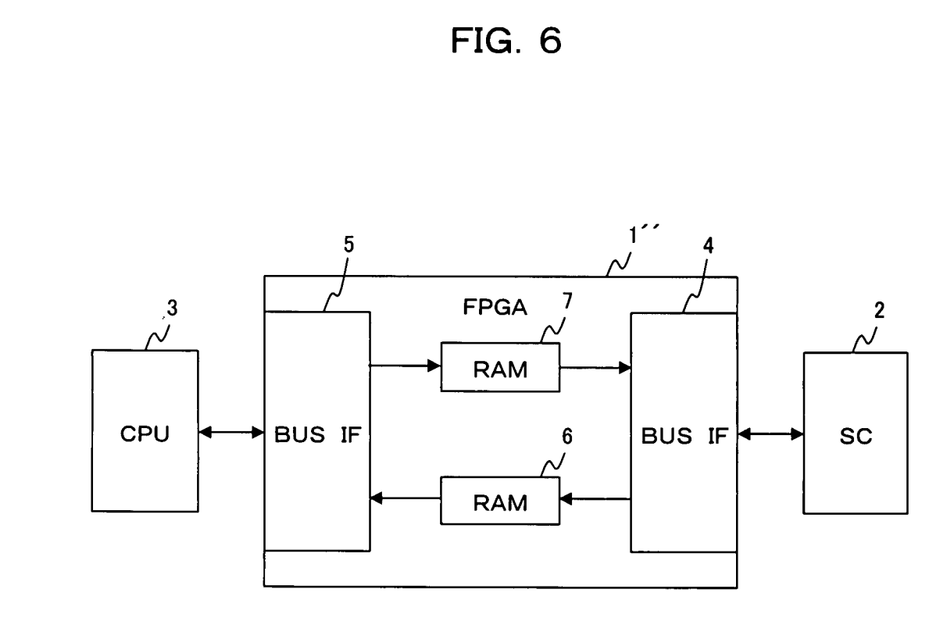
FIG. 6 is a block diagram showing a structure of a speed converting apparatus according to a modification of this invention.

In the above embodiment, the speed converting apparatus 1 has the load controlling circuit 30. However, if it is not necessary to control the load of a request on the SC 2 or the CPU 3, the speed converting apparatus can be configured, as shown in FIG. 6, as a speed converting apparatus 1″ comprising a bus interface unit 4 with the SC 2, a bus interface unit 5 with the CPU 3 and storage units (denoted as RAMs in the drawing) 6 and 7.

Like the above SC interface controlling circuit 10, the bus interface unit 4 operates for the SC 2 according to the system clock of the SC 2.

Like the above CPU interface controlling circuit 20, the bus interface unit 5 operates for the CPU 3 according to the system clock of the CPU 3.

The storage unit 6 is the same as the above storage unit 12. The storage unit 7 is the same as the above storage unit 22.

The speed converting apparatus 1″ according to a modification of this invention can certainly absorb a difference in operation speed between the SC 2 and the CPU 3 in a very simple structure. The bus interface units 4 and 5 can be configured by realizing the bus interface units in the known speed converting apparatus 100 described above with reference to FIG. 7 on an FPGA configuring the speed converting apparatus 1″, it is thus possible to readily realize the speed converting apparatus 1″ within a short time.

What is claimed is:

1. A speed converting apparatus with a load controlling function interposed between an emulation device on which a target to be verified is emulated and an arithmetic unit connected to said emulation device to verify said target to be verified, on the basis of an operation of said emulation device in response to a request to said emulation device, to absorb a difference in operation speed between said emulation device and said arithmetic unit, said speed converting apparatus comprising:
   a first interface unit which operates for said emulation device according to a system clock of said emulation device to function as an interface with said emulation device;
   a second interface unit which operates for said arithmetic unit according to a system clock of said arithmetic unit to function as an interface with said arithmetic unit; and
   a load controlling unit interposed between said first interface unit and said second interface unit to control at least either a load on said emulation device caused by a request outputted to said emulation device through said first interface unit or a load on said arithmetic unit caused by a request outputted to said arithmetic unit through said second interface unit, wherein
   said load controlling unit comprises a generating unit which generates the request to be outputted to said emulation device or said arithmetic unit.

2. The speed converting apparatus with a load controlling function according to claim 1, wherein said first interface unit comprises a first storage unit which performs an operation of writing a request generated by said emulation device according to the system clock of said emulation device, and which performs an operation of reading out the request to said arithmetic unit according to the system clock of said arithmetic unit.

3. The speed converting apparatus with a load controlling function according to claim 1, wherein said second interface unit comprises a second storage unit which performs an operation of writing a request generated by said arithmetic unit according to the system clock of said arithmetic unit, and which performs an operation of reading out the request to said emulation device according to the system clock of said emulation device.

4. The speed converting apparatus with a load controlling function according to claim 1 further comprising a first output interval varying unit which varies an interval at which requests are to be outputted to said emulation device.

5. The speed converting apparatus with a load controlling function according to claim 4 further comprising a first output interval setting unit which sets the request output interval varied by said first output interval varying unit.

6. The speed converting apparatus with a load controlling function according to claim 1 further comprising a second output interval varying unit which varies an interval at which requests are to be outputted to said arithmetic unit.

7. The speed converting apparatus with a load controlling function according to claim 6 further comprising a second output interval setting unit which sets the request output interval varied by said second output interval varying unit.

8. The speed converting apparatus with a load controlling function according to claim 1, wherein said generating unit comprises:
   a first generating unit which generates the request to be outputted to said emulation device by using data retained in a cache memory of said emulation device; and
   a second generating unit which generates the request to be outputted to said emulation device by using data not retained in said cache memory of said emulation device.

9. The speed converting apparatus with a load controlling function according to claim 8 further comprising a first data information retaining unit which retains data information on the data retained in said cache memory of said emulation device; and
   said first generating unit generating a request to said emulation device on the basis of the data information retained in said first data information retaining unit.

10. The speed converting apparatus with a load controlling function according to claim 1 further comprising a request contents setting unit which sets contents of a request generated by said generating unit.

11. The speed converting apparatus with a load controlling function according to claim 1 further comprising a mode setting unit which sets a mode in which a request is generated by said generating unit.

12. The speed converting apparatus with a load controlling function according to claim 1, wherein said generating unit comprises:
   a first generating unit which generates a request to said arithmetic unit by using data retained in a cache memory of said arithmetic unit; and
   a second generating unit which generates a request to said arithmetic unit by using data not retained in said cache memory of said arithmetic unit.

13. The speed converting apparatus with a load controlling function according to claim 12 further comprising a second data information retaining unit which retains data information on the data retained in said cache memory of said arithmetic unit; and
   said first generating unit generating a request to said arithmetic unit on the basis of the data information retained in said second data information retaining unit.

14. The speed converting apparatus with a load controlling function according to claim 1 further comprising a request contents setting unit which sets contents of a request generated by said generating unit.

15. The speed converting apparatus with a load controlling function according to claim 1, wherein said load controlling unit comprises a first output order changing unit which changes the order in which requests are to be outputted to said emulation device.

16. The speed converting apparatus with a load controlling function according to claim 15 further comprising a first output order setting unit which sets the order changed by said first output order changing unit.

17. The speed converting apparatus with a load controlling function according to claim 1, wherein said load controlling unit comprises a second output order changing unit which changes the order in which requests are to be outputted to said arithmetic unit.

18. The speed converting apparatus with a load controlling function according to claim 17 further comprising a second output order setting unit which sets the order changed by said second output order changing unit.

19. An information processing system comprising:
   an emulation device emulating a target to be verified;
   an arithmetic unit, connected to said emulation device, verifying said target on the basis of an operation of said emulation device which operation is responsive to a request to said emulation device; and
   a speed converting apparatus with a load controlling function, interposed between said emulation device and said arithmetic unit, absorbing a difference in operation speed between said emulation device and said arithmetic unit, wherein said speed converting apparatus comprises a first interface unit operating for said emulation device according to a system clock of said emulation device to function as an interface with said emulation device, a second interface unit operating for said arithmetic unit according to a system clock of said arithmetic unit to function as an interface with said arithmetic unit, and a load controlling unit interposed between said first interface unit and said second interface unit to control at least either a load on said emulation device caused by a request outputted to said emulation device through said first interface unit or a load on said arithmetic unit caused by a request outputted to said arithmetic unit through said second interface unit, wherein said load controlling unit comprises a generating unit which generates the request to be outputted to said emulation device or said arithmetic unit.

20. An emulator controller comprising:

an emulator emulating a target;

an verifier connected to said emulator, the verifier verifying said target on the basis of an operation of said emulator, the operation being in response to a request to said emulator; and a load controller interposed between said emulator and said verifier, the load controller absorbing a difference in operation speed between said emulator and said verifier, wherein said load controller comprises:

an emulator interface operating at a speed of an emulator clock of the emulator, a verifier interface unit operating at a speed of a verifier clock of the verifier, and the load controller controlling at least either a load on said emulator caused by a request outputted to said emulator through said emulator interface or a load on said verifier caused by a request outputted to said verifier through said verifier interface, wherein the load controller comprises a generator which generates the request to be outputted to said emulator or said verifier.

* * * * *